(12) United States Patent
Sivanesan et al.

(10) Patent No.: US 7,929,930 B2
(45) Date of Patent: Apr. 19, 2011

(54) APPARATUS AND METHOD FOR COOPERATIVE MAXIMUM RATIO TRANSMISSION IN A BROADBAND WIRELESS ACCESS COMMUNICATION SYSTEM

(75) Inventors: Kathiravetpillai Sivanesan, Suwon-si (KR); Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 997 days.

(21) Appl. No.: 11/752,046

(22) Filed: May 22, 2007

(65) Prior Publication Data

US 2007/0270112 A1   Nov. 22, 2007

(30) Foreign Application Priority Data

May 22, 2006   (KR) ..................... 10-2006-0045759

(51) Int. Cl.
*H04B 1/18* (2006.01)
(52) U.S. Cl. ............... 455/185.1; 455/11.1; 455/13.1; 455/150.1; 455/179.1; 455/7; 379/328; 379/315

(58) Field of Classification Search ............. 370/328, 370/315; 455/185.1, 11.1, 13.1, 150.3, 179.1, 455/7
See application file for complete search history.

(56) References Cited

U.S. PATENT DOCUMENTS

| 7,676,007 B1* | 3/2010 | Choi et al. ............. 375/347 |
| 2004/0229563 A1* | 11/2004 | Fitton et al. ............. 455/7 |

FOREIGN PATENT DOCUMENTS

| JP | 2001-285186 | 10/2001 |
| JP | 2004-349875 | 12/2004 |

* cited by examiner

*Primary Examiner* — Huy Phan
*Assistant Examiner* — William F Rideout
(74) *Attorney, Agent, or Firm* — The Farrell Law Firm, P.C.

(57) ABSTRACT

An apparatus and method for cooperative maximal ratio transmission in a BWA communication system are provided, in which a BS transmits a signal directed to a user terminal to an RS in a first time slot, the RS transmits the signal received from the BS to the user terminal in a second time slot, and the user terminal receives the signal from the RS.

44 Claims, 10 Drawing Sheets

APPARATUS AND METHOD FOR COOPERATIVE MAXIMUM RATIO TRANSMISSION IN A BROADBAND WIRELESS ACCESS COMMUNICATION SYSTEM

PRIORITY

This application claims priority under 35 U.S.C. §119 to an application filed in the Korean Intellectual Property Office on May 22, 2006 and assigned Serial No. 2006-45759, the contents of which are incorporated herein by reference.

BACKGROUND OF THE INVENTION

1. Field of the Invention

The present invention relates generally to a Broadband Wireless Access (BWA) communication system, and in particular, to an apparatus and method for enabling information transmission at a maximum ratio from a Base Station (BS) to a Mobile Station (MS) in a BWA communication system using Relay Stations (RSs).

2. Description of the Related Art

Providing services with diverse Quality of Service (QoS) requirements at or above 100 Mbps to users is an active study area for a future-generation communication system called a $4^{th}$ Generation (4G) communication system. Particularly, active research is being conducted on the provisioning of high-speed service by ensuring mobility and QoS to BWA communication systems such as Wireless Local Area Network (WLAN) and Wireless Metropolitan Area Network (WMAN). Such major examples of these systems are Institute of Electrical and Electronics Engineers (IEEE) 802.16a and IEEE 802.16e.

The IEEE 802.16a and IEEE 802.16e communication systems adopt Orthogonal Frequency Division Multiplexing (OFDM)/Orthogonal Frequency Division Multiple Access (OFDMA) to support a broadband transmission network for WMAN physical channels. IEEE 802.16a considers only a single-cell structure with no regard to mobility of Subscriber Stations (SSs). In contrast, IEEE 802.16e supports the SSs' mobility to the IEEE 802.16d communication system. A Mobile SS is referred to as an MS. Herein below, both the MS and the SS are commonly called user terminals.

FIG. 1 illustrates the configuration of a conventional IEEE 802.16e communication system.

In FIG. 1, the IEEE 802.16e communication system is configured in a multi-cell structure. Specifically, it includes cells 100 and 150, BSs 110 and 140 for managing the cells 100 and 150, respectively, and a plurality of user terminals 111, 113, 130, 151 and 153. Signaling is carried out in OFDM/OFDMA between the BSs 110 and 140 and the user terminals 111, 113, 130, 151 and 153.

The user terminal 130 is located in a cell boundary area between the cells 100 and 150, i.e. in a handover region. When the user terminal 130 moves to the cell 150 managed by the BS 140 during communications with the BS 110, a serving BS of the user terminal 130 changes from the BS 110 to the BS 140.

Since signaling is performed between a user terminal and a fixed BS via a direct link as illustrated in FIG. 1, a highly-reliable radio communication link can be established between them in the conventional IEEE 802.16e communication system. However, due to the fixedness of BSs, a wireless network cannot be configured with flexibility. As a result, the IEEE 802.16e communication system is not effective in efficiently providing communication services under a radio environment experiencing a fluctuating traffic distribution and a great change in the number of required calls.

The above problem can be solved by applying a multi-hop relay data transmission scheme using fixed Relay Stations (RSs), mobile RSs, or general user terminals to general cellular wireless communication systems such as IEEE 802.16e.

The multi-hop relay wireless communication system can advantageously reconfigure a network rapidly according to a communication environmental change and enables efficient operation of the whole wireless network. It can expand cell coverage and increase system capacity. When the channel status between a BS and a user terminal is bad, an RS can be installed between them so that the resulting establishment of a multi-hop relay path through the RS renders a higher-speed radio channel available to the user terminal. With the use of the multi-hop relay scheme at a cell boundary offering a bad channel status, high-speed data channels can be provided and the cell coverage area can be expanded.

FIG. 2 illustrates the configuration of a conventional relay BWA communication system.

Referring to FIG. 2, the multi-hop relay BWA communication system, which is configured in a multi-cell structure, includes cells 200 and 240, BSs 210 and 250 for managing the cells 200 and 240, respectively; a plurality of user terminals 211, 213, 251, 253 and 255 within the coverage areas of the cells 200 and 240; a plurality of user terminals 221, 223, 261 and 263 managed by the BSs 210 and 250 but located in areas 230 and 270 outside the cells 200 and 240; and RSs 220 and 260 for providing multi-hop relay paths between the BSs 210 and 250 and the user terminals 221, 223, 261 and 263.

OFDM/OFDMA signals are exchanged among the BSs 210 and 250, the RSs 220 and 260, and the user terminals 211, 213, 221, 223, 251, 253, 255, 261 and 263. Although the user terminals 211 and 213, within the coverage area of the cell 200, and the RS 220 can communicate directly with the BS 210, the user terminals 221 and 223, within the area 230, cannot directly communicate with the BS 210. Therefore, the RS 220, covering the area 230, relays signals between the BS 210 and the user terminals 211 and 223. That is, the user terminals 221 and 223 can transmit and receive signals to and from the BS 210 via the RS 220.

Meanwhile, although the user terminals 251, 253 and 255, within the coverage area of the cell 240, and the RS 260 can communicate directly with the BS 250, the user terminals 261 and 263, within the area 270, cannot directly communicate with the BS 250. Therefore, the RS 260 covering the area 270 relays signals between the BS 250 and the user terminals 261 and 263. That is, the user terminals 261 and 263 can exchange signals with the BS 250 via the RS 260.

In order to effectively deliver signals in the BWA communication system, diversity schemes have been studied. The diversity schemes aim to increase link reliabilities among an RS, a BS, and a user terminal and signal detectability at a receiver.

One of the diversity schemes, transmit diversity, is branched into Maximum Ratio Transmission (MRT) and Maximum Ratio Combining (MRC).

MRC uses a plurality of receive-antennas or a plurality of frequency channels, whereas MRT requires a plurality of transmit-antennas and channel state information feedback from a receiver to a transmitter. In the former scheme, signals received at the receive-antennas are combined to achieve a maximum Signal-to-Noise Ratio (SNR), resulting in weighting the received signals with conjugate channel gains. The latter scheme requires neither physical equipment such as a plurality of receive-antennas and nor additional radio resources to achieve a diversity gain. It also decreases intercell interference, thereby saving power from transmission.

However, MRT has been studied with no regard to use of RSs. Accordingly, with the introduction of a BWA communication system using RSs, there exists a need for developing an MRT scheme involving the RSs.

SUMMARY OF THE INVENTION

An aspect of the present invention is to substantially solve at least the above problems and/or disadvantages and to provide at least the advantages below. Accordingly, an aspect of the present invention is to provide a method and apparatus for cooperative maximal ratio transmission through an RS in a BWA communication system.

According to one aspect of the present invention, there is provided a system for transmitting data at a maximum ratio in a BWA communication system, in which a BS transmits a signal directed to a user terminal to an RS in a first time slot; the RS transmits the signal received from the BS to the user terminal in a second time slot; and the user terminal receives the signal from the RS.

According to another aspect of the present invention, there is provided a method for transmitting data at a maximum ratio in a BWA communication system, in which a signal is transmitted from a BS to an RS in a first time slot, and the signal is transmitted from the RS to a user terminal in a second time slot.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for cooperative maximal ratio transmission in a BWA communication system. "Cooperative" means that an RS between a BS and a user terminal, cooperates in communications between the BS and the user terminal.

The BWA communication system operates in OFDM/OFDMA. In view of the nature of OFDM/OFDMA, i.e. transmission of physical channel signals on a plurality of subcarriers, the BWA communication system is capable of high-speed data transmission and supports user terminals' mobility in a multi-cell structure. While the present invention is described in the context of a BWA communication system, it is to be clearly understood that the present invention is applicable to any cellular communication system using RSs.

The following description is made on the assumption that a BS with a single antenna has one or more RSs each having one or more antennas within its service area and a user terminal has a single antenna.

It is assumed that the BS acquires Channel State Information (CSI) by a general report procedure and the RS forwards signals or information in AF or DF mode.

The RS amplifies a received signal prior to forwarding in the AF mode, while it decodes a received signal prior to forwarding in the DF mode. Therefore, the AF scheme is significantly affected by signal noise between a transmitter and the RS, and the DF scheme is affected by signal transmission accuracy between the transmitter and the RS.

A description will first be made of the case where a direct communication link does not exist between a BS and a user terminal.

Figure 1:
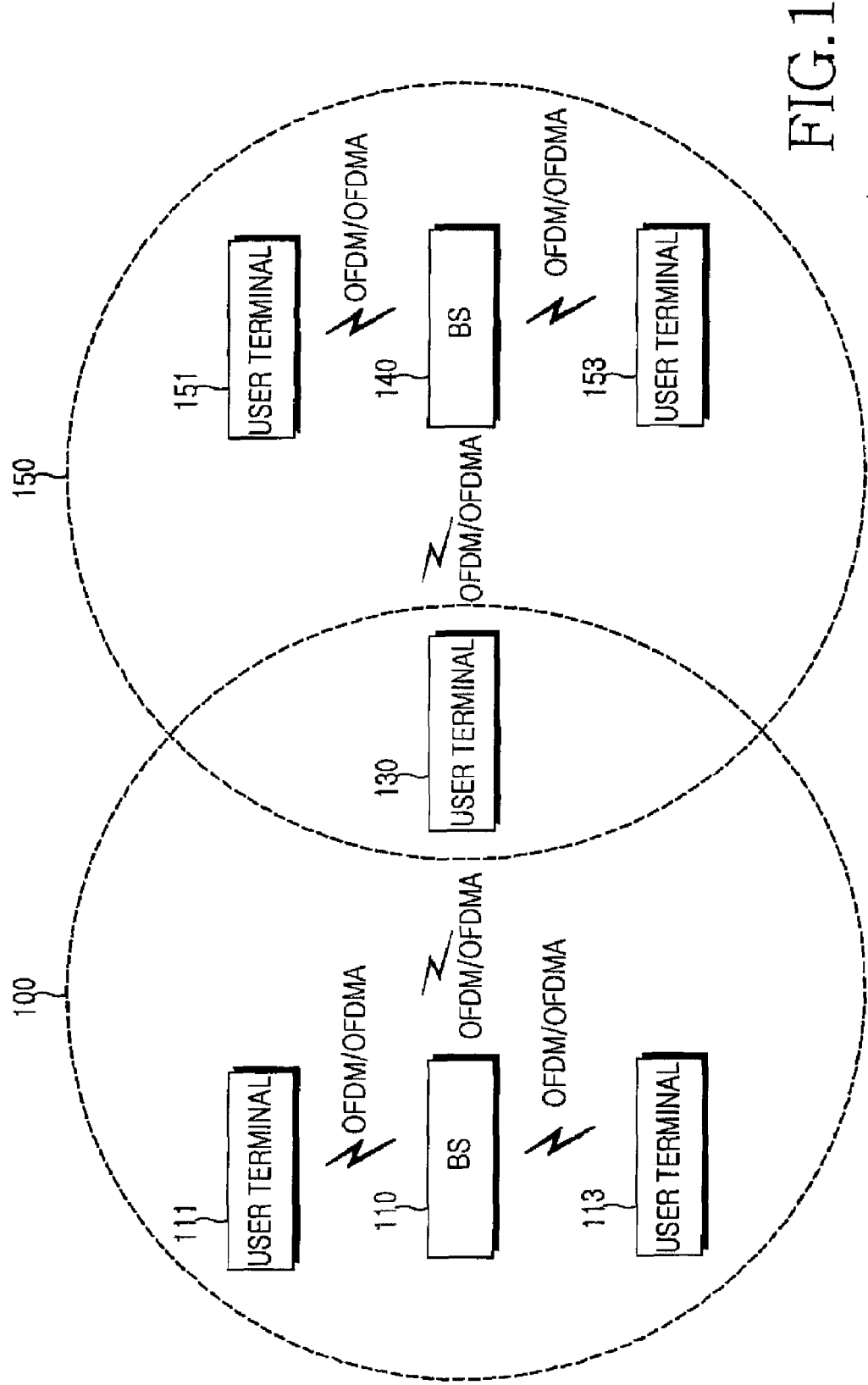
FIG. 1 illustrates the configuration of a conventional IEEE 802.16e communication system.
Figure 2:
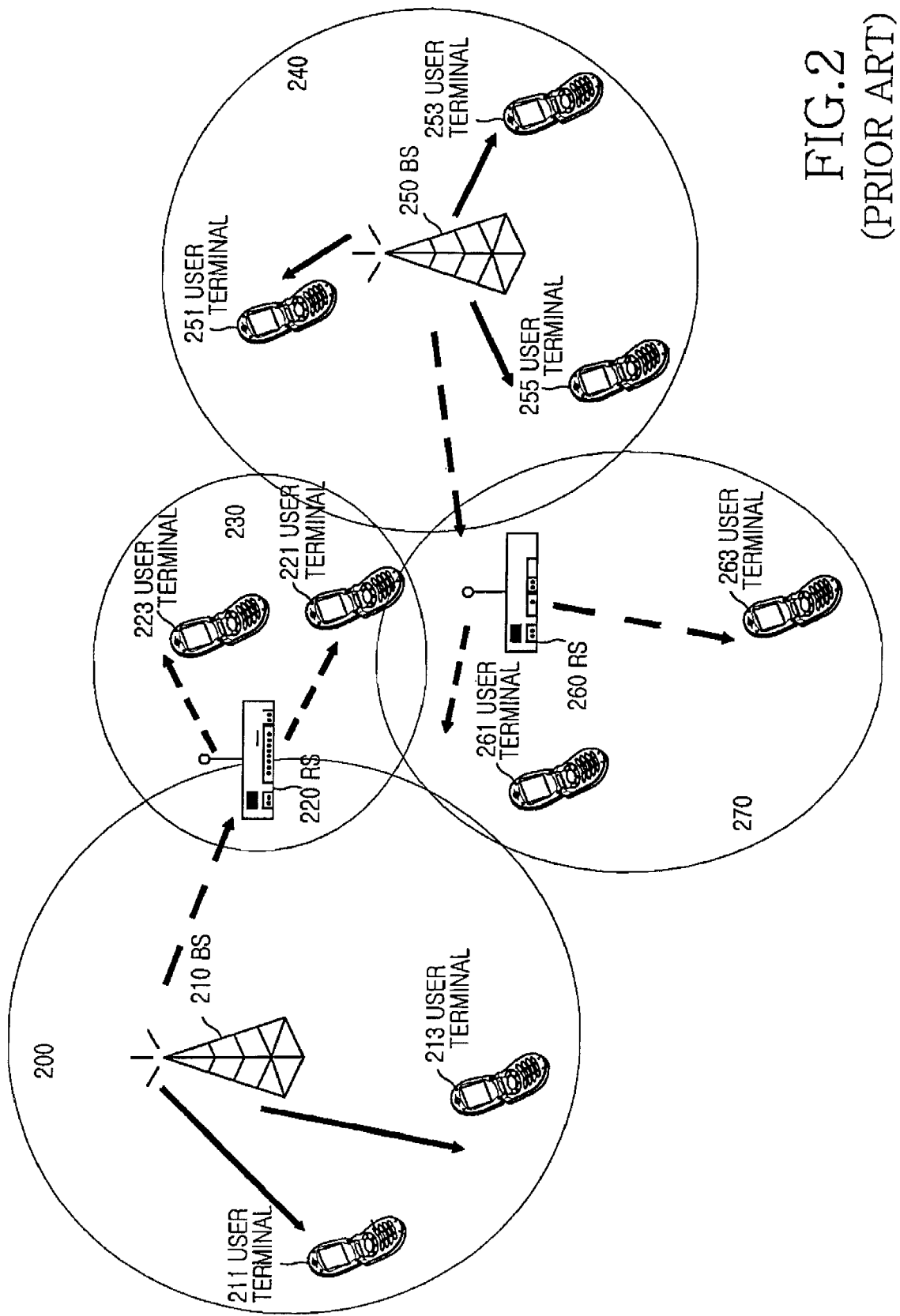
FIG. 2 illustrates the configuration of a conventional relay BWA communication system.
Figure 3:
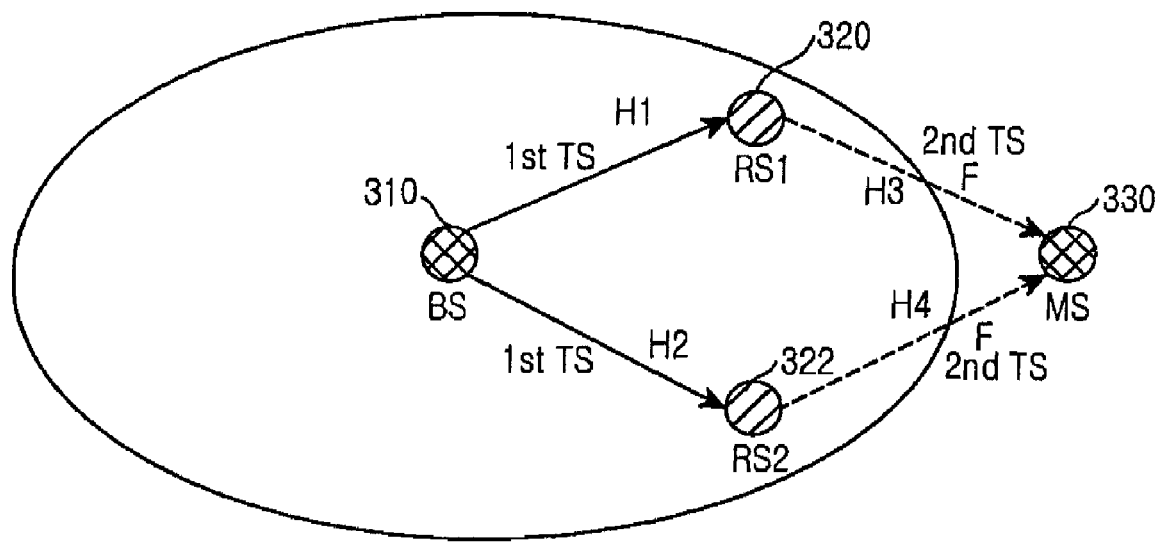
FIG. 3 illustrates a case where a direct communication link does not exist between a BS and a user terminal according to the present invention.

FIG. 3 illustrates a case where a direct communication link does not exist between a BS and a user terminal according to the present invention.

Referring to FIG. 3, a BS 310 transmits a signal directed to a user terminal 330 (MS) to first and second RSs 320 and 322 (RS1 and RS2) in a first Time Slot (TS). RS1 and RS2 forward the received signals to the user terminal 330 in a second TS of the same frequency channel.

Let transmit power be denoted by p, Additive White Gaussian Noise (AWGN) be denoted by $n_i$ (i$\in\{1, 2, 3, 4\}$), a channel gain be denoted by $h_i$, and a transmitted modulation symbol denoted by x. The modulation symbol x is a Quadrature Phase Shift Keying (QPSK) symbol, for example.

Then, the signal transmitted by the BS 310 is $\sqrt{p}x$, the signal received at RS1 is $r_1 = \sqrt{p}h_1 x + n_1$, and the signal received at RS2 is $r_2 = \sqrt{p}h_2 x + n_2$.

If RS1 and RS2 operate in the AF mode and use MRT, the signal forwarded by RS1 is given by Equation (1):

$$r_3 = \frac{\sqrt{p}\, h_3^* h_1^*}{|r_1|\sqrt{h_1^2 h_3^2 + h_2^2 h_4^2}} (\sqrt{p}\, h_1 x + n_1) \qquad (1)$$

and the signal forwarded by RS2 is given by Equation (2):

$$r_4 = \frac{\sqrt{p}\, h_2^* h_4^*}{|r_2|\sqrt{h_1^2 h_3^2 + h_2^2 h_4^2}} (\sqrt{p}\, h_2 x + n_2) \qquad (2)$$

The signal received at the user terminal 330 is shown in Equation (3):

$$r = h_3 r_3 + h_4 r_4 + n_3 \qquad (3)$$

The reception SNR of the user terminal 330 is maximized by multiplying the signals received from RS1 and RS2 by $$\frac{h_3^* h_1^*}{h_1^2 h_3^2 + h_2^2 h_4^2} \text{ and } \frac{h_2^* h_4^*}{h_1^2 h_3^2 + h_2^2 h_4^2},$$

respectively. ( )* denotes a conjugate complex value.

If RS1 and RS2 operate in the AF mode and use Equal Gain Transmission (EGT), the signal forwarded by RS1 is given by Equation (4):

$$r_3 = \frac{\sqrt{\frac{p}{2}}}{|r_1|}\left(\sqrt{p}\, h_1 x + n_1\right) \quad (4)$$

and the signal forwarded by RS2 is given by Equation (5):

$$r_4 = \frac{\sqrt{\frac{p}{2}}}{|r_2|}\left(\sqrt{p}\, h_2 x + n_2\right) \quad (5)$$

The signal received at the user terminal 330 is shown in Equation (6):

$$r = h_3 r_3 + h_4 r_4 + n_3 \quad (6)$$

RS1 and RS2 weight the received EGT signals equally.

If RS1 and RS2 operate in the AF mode and use MRC, the signal forwarded by RS1 is given by Equation (7):

$$r_3 = \frac{\sqrt{\frac{p}{2}}}{|r_1|}\left(\sqrt{p}\, h_1 x + n_1\right) \quad (7)$$

and the signal forwarded by RS2 is given by Equation (8):

$$r_4 = \frac{\sqrt{\frac{p}{2}}}{|r_2|}\left(\sqrt{p}\, h_2 x + n_2\right) \quad (8)$$

After MRC, the signal received at the user terminal 330 is shown in Equation (9):

$$r = (h_3 r_3 + n_3) h^*{}_3 h^*{}_1 + (h_4 r_4 + n_4) h^*{}_4 h^*{}_2 \quad (9)$$

Signals received through different antennas or on different frequency channels are weighted with $h^*{}_3 h^*{}_1$ and $h^*{}_4 h^*{}_2$.

Let a detected modulation symbol be denoted by $\hat{x}$. Then, if RS1 and RS2 operate in the DF mode and use MRT, the signal forwarded by RS1 is given by Equation (10):

$$r_3 = \frac{\sqrt{p}\, h_3^* \hat{x}}{\sqrt{h_3^2 + h_4^2}} \quad (10)$$

and the signal forwarded by RS2 is given by Equation (11):

$$r_4 = \frac{\sqrt{p}\, h_4^* \hat{x}}{\sqrt{h_3^2 + h_4^2}} \quad (11)$$

The signal received at the user terminal 330 is shown in Equation (12):

$$r = h_3 r_3 + h_4 r_4 + n_3 \quad (12)$$

The reception SNR of the user terminal 330 is maximized by multiplying the signals received from RS1 and RS2 by $$\frac{h_3^*}{\sqrt{h_3^2 + h_4^2}} \text{ and } \frac{h_4^*}{\sqrt{h_3^2 + h_4^2}},$$

respectively.

If RS1 and RS2 operate in the DF mode and use EGT, the signal forwarded by RS1 is given by Equation (13):

$$r_3 = \sqrt{\frac{p}{2}}\, \hat{x} \quad (13)$$

and the signal forwarded by RS2 is given by Equation (14):

$$r_4 = \sqrt{\frac{p}{2}}\, \hat{x} \quad (14)$$

The signal received at the user terminal 330 is shown in Equation (15):

$$r = h_3 r_3 + h_4 r_4 + n_3 \quad (15)$$

RS1 and RS2 weight the received EGT signals equally.

If RS1 and RS2 operate in the DF mode and use MRC, the signal forwarded by RS1 is given by Equation (16):

$$r_3 = \sqrt{\frac{p}{2}}\, \hat{x} \quad (16)$$

and the signal forwarded by RS2 is given by Equation (17):

$$r_4 = \sqrt{\frac{p}{2}}\, \hat{x} \quad (17)$$

After MRC, the signal received at the user terminal 330 is shown in Equation (18):

$$r = (h_3 r_3 + n_3) h^*{}_3 + (h_4 r_4 + n_4) h^*{}_4 \quad (18)$$

Signals received through different antennas or on different frequency channels are weighted with $h^*{}_3$ and $h^*{}_4$.

Now a description will be made of the case where a direct communication link exists between a BS and a user terminal.

Figure 4:
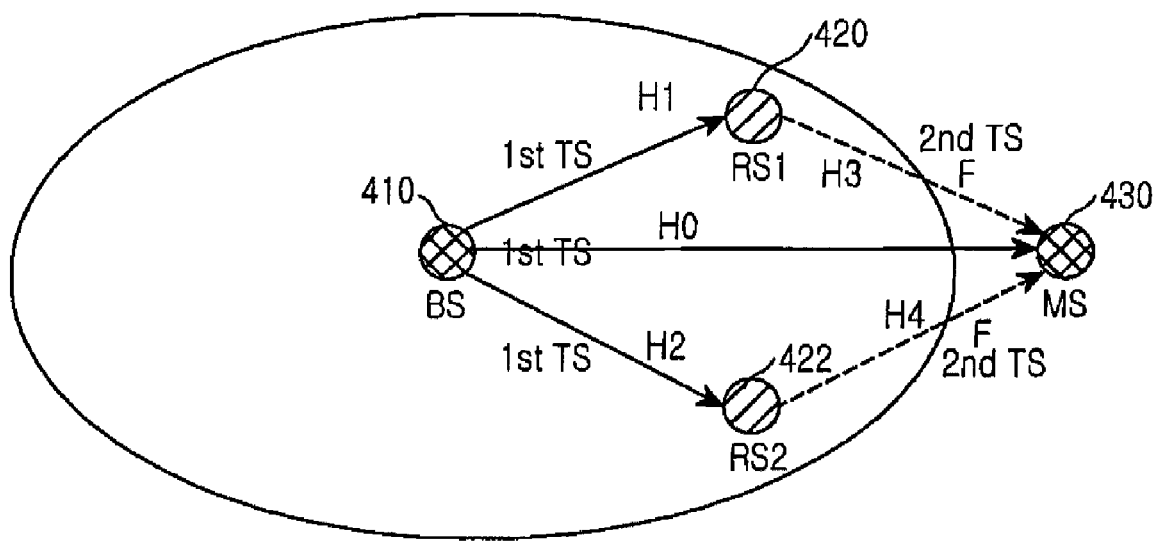
FIG. 4 illustrates a case where a direct communication link exists between a BS and a user terminal according to the present invention.

FIG. 4 illustrates a case where a direct communication link exists between a BS and a user terminal according to the present invention.

Referring to FIG. 4, a BS 410 transmits a signal in a first TS. A user terminal 430 and first and second RSs 420 and 422 (RS1 and RS2) receive the signal from the BS 410.

RS1 and RS2 forward the received signals to the user terminal 430 in a second time slot of the same frequency channel.

Let transmit power be denoted by p, AWGN be denoted by $n_i$ (i∈{1, 2, 3, 4}), a channel gain be denoted by $h_i$, and a transmitted modulation symbol denoted by x.

Then, the signal transmitted by the BS 410 is $\sqrt{p}x$, the signal received at the user terminal 430 is $r_0=\sqrt{p}h_0x+n_0$, the signal received at RS1 is $r_1=\sqrt{p}h_1x+n_1$, and the signal received at RS2 is $r_2=\sqrt{p}h_2x+n_2$.

If RS1 and RS2 operate in the AF mode and use MRT, the signal forwarded by RS1 is given by Equation (19):

$$r_3 = \frac{\sqrt{p}\, h_3^* h_1^*}{|r_1|\sqrt{h_1^2 h_3^2 + h_2^2 h_4^2}} (\sqrt{p}\, h_1 x + n_1) \qquad (19)$$

and the signal forwarded by RS2 is given by Equation (20):

$$r_4 = \frac{\sqrt{p}\, h_2^* h_4^*}{|r_2|\sqrt{h_1^2 h_3^2 + h_2^2 h_4^2}} (\sqrt{p}\, h_2 x + n_2) \qquad (20)$$

The signal received at the user terminal 430 in the second TS is shown in Equation (21):

$$r_5 = h_3 r_3 + h_4 r_4 + n_3 \qquad (21)$$

Thus, the total signal received at the user terminal 430 is given as shown in Equation (22):

$$r = r_0 h^*_0 + h_3 r_3 + h_4 r_4 + n_3 \qquad (22)$$

The reception SNR of the user terminal 430 is maximized by multiplying the signals received from RS1 and RS2 by $$\frac{h_3^* h_1^*}{\sqrt{h_1^2 h_3^2 + h_2^2 h_4^2}} \text{ and } \frac{h_2^* h_4^*}{\sqrt{h_1^2 h_3^2 + h_2^2 h_4^2}},$$

respectively and multiplying the signal $r_0$ received in the first TS by $h^*_0$.

If RS1 and RS2 operate in the AF mode and use EGT, the signal forwarded by RS1 is given by Equation (23):

$$r_3 = \frac{\sqrt{\frac{p}{2}}}{|r_1|} (\sqrt{p}\, h_1 x + n_1) \qquad (23)$$

and the signal forwarded by RS2 is given by Equation (24):

$$r_4 = \frac{\sqrt{\frac{p}{2}}}{|r_2|} (\sqrt{p}\, h_2 x + n_2) \qquad (24)$$

The signal received at the user terminal 430 in the second TS is shown in Equation (25):

$$r_5 = h_3 r_3 + h_4 r_4 + n_3 \qquad (25)$$

Thus, the total signal received at the user terminal 430 is given as Equation (26):

$$r = r_0 + h_3 r_3 + h_4 r_4 + n_3 \qquad (26)$$

If RS1 and RS2 operate in the AF mode and use MRC, the signal forwarded by RS1 is given by Equation (27):

$$r_3 = \frac{\sqrt{\frac{p}{2}}}{|r_1|} (\sqrt{p}\, h_1 x + n_1) \qquad (27)$$

and the signal forwarded by RS2 is given by Equation (28):

$$r_4 = \frac{\sqrt{\frac{p}{2}}}{|r_2|} (\sqrt{p}\, h_2 x + n_2) \qquad (28)$$

The signal received at the user terminal 430 in the second TS is shown in Equation (29):

$$r_5 = (h_3 r_3 + n_3) h^*_3 + (h_4 r_4 + n_4) h^*_4 \qquad (29)$$

Thus, the total signal received at the user terminal 430 is given as Equation (30):

$$r = r_0 h^*_0 + r_5 \qquad (30)$$

Let a detected modulation symbol be denoted by $\hat{x}$. Then, if RS1 and RS2 operate in the DF mode and use MRT, the signal forwarded by RS1 is given by Equation (31):

$$r_3 = \frac{\sqrt{p}\, h_3^* \hat{x}}{\sqrt{h_3^2 + h_4^2}} \qquad (31)$$

and the signal forwarded by RS2 is given by Equation (32):

$$r_4 = \frac{\sqrt{p}\, h_4^* \hat{x}}{\sqrt{h_3^2 + h_4^2}} \qquad (32)$$

The signal received at the user terminal 430 in the second TS is shown in Equation (33):

$$r_5 = h_3 r_3 + h_4 r_4 + n_3 \qquad (33)$$

Thus, the total signal received at the user terminal 430 is given as Equation (34):

$$r = h^*_0 r_0 + r_5 \qquad (34)$$

The reception SNR of the user terminal 430 is maximized by multiplying the signals received from RS1 and RS2 by $$\frac{h_3^*}{\sqrt{h_3^2 + h_4^2}} \text{ and } \frac{h_4^*}{\sqrt{h_3^2 + h_4^2}},$$

respectively and multiplying the signal $r_0$ received in the first TS by $h^*_0$.

If RS1 and RS2 operate in the DF mode and use EGT, the signal forwarded by RS1 is given by Equation (35):

$$r_3 = \sqrt{\frac{p}{2}} \hat{x} \tag{35}$$

and the signal forwarded by RS2 is given by Equation (36):

$$r_4 = \sqrt{\frac{p}{2}} \hat{x} \tag{36}$$

The signal received at the user terminal 430 in the second TS is shown in Equation (37):

$$r_5 = h_3 r_3 + h_4 r_4 + n_3 \tag{37}$$

Thus, the total signal received at the user terminal 430 is given as Equation (38):

$$r = r_0 + h_3 r_3 + h_4 r_4 + n_3 \tag{38}$$

Equation (38) is simplified to Equation (39):

$$r = r_0 + r_5 \tag{39}$$

If RS1 and RS2 operate in the DF mode and use MRC, the signal forwarded by RS1 is given by Equation (40):

$$r_3 = \sqrt{\frac{p}{2}} \hat{x} \tag{40}$$

and the signal forwarded by RS2 is given by Equation (41):

$$r_4 = \sqrt{\frac{p}{2}} \hat{x} \tag{41}$$

The signal received at the user terminal 430 in the second TS is shown in Equation (42):

$$r_5 = (h_3 r_3 + n_3) h^*_3 + (h_4 r_4 + n_4) h^*_4 \tag{42}$$

Thus, the total signal received at the user terminal 430 is given as Equation (43):

$$r = r_0 h^*_0 + r_5 \tag{43}$$

Signals received through different antennas or on different frequency channels are weighted with $h^*_3$, $h^*_4$ and $h^*_0$.

The case where a direct communication link is established between a BS and a user terminal but communications are failed between them via the direct communication link will be described.

Figure 5:
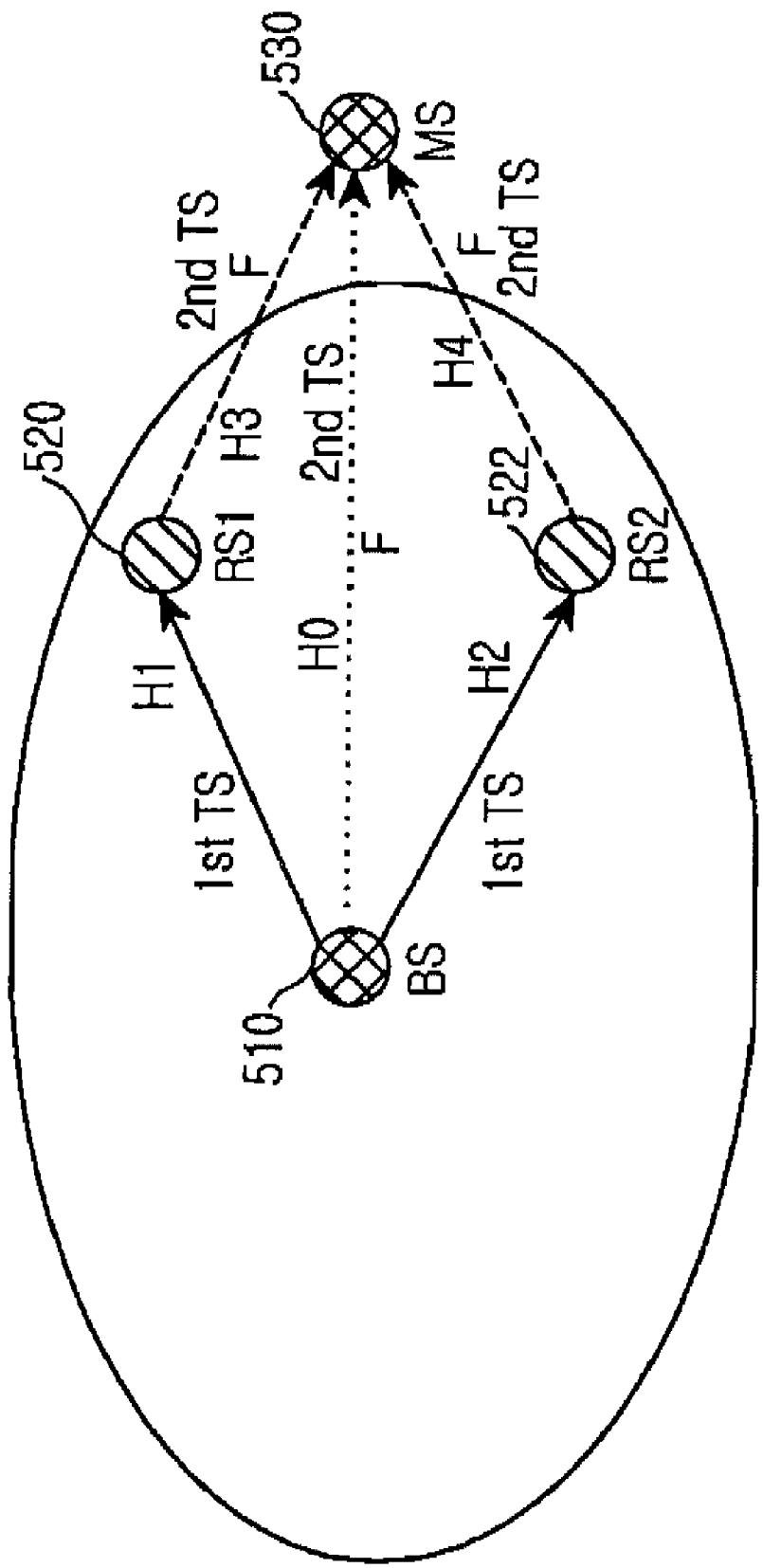
FIG. 5 illustrates a case where a direct communication link is established between a BS and a user terminal, but the user terminal fails to receive a signal from the BS via the direct communication link according to the present invention.

FIG. 5 illustrates a case in which a direct communication link is established between a BS and a user terminal but the user terminal fails to receive a signal from the BS via the direct communication link according to the present invention.

Referring to FIG. 5, a BS 510 transmits a signal in a first TS. A user terminal 530 fails to receive the signal but first and second RSs 520 and 522 (RS1 and RS2) receive the signal from the BS 510.

RS1 and RS2 forward the received signals to the user terminal 530 in a second time slot of the same frequency channel.

Let transmit power be denoted by p, AWGN be denoted by $n_i$ (i∈{1, 2, 3, 4}), a channel gain be denoted by $h_i$, and a transmitted modulation symbol denoted by x.

Then, the signal transmitted by the BS 510 is $\sqrt{p}x$, the signal received at RS1 is $r_1 = \sqrt{p} h_1 x + n_1$, and the signal received at RS2 is $r_2 = \sqrt{p} h_2 x + n_2$.

If RS1 and RS2 operate in the AF mode and use MRT, a signal transmitted by the BS 510 in the second TS is given by Equation (44):

$$r_0 = \frac{\sqrt{p}\, h_0^* x}{\sqrt{h_1^2 h_3^2 + h_2^2 h_4^2 + h_0^2}} \tag{44}$$

The signal forwarded by RS1 is given by Equation (45):

$$r_3 = \frac{\sqrt{p}\, h_3^* h_1^*}{|r_1|\sqrt{h_1^2 h_3^2 + h_2^2 h_4^2 + h_0^2}} (\sqrt{p}\, h_1 x + n_1) \tag{45}$$

and the signal forwarded by RS2 is given by Equation (46):

$$r_4 = \frac{\sqrt{p}\, h_2^* h_4^*}{|r_2|\sqrt{h_1^2 h_3^2 + h_2^2 h_4^2 + h_0^2}} (\sqrt{p}\, h_2 x + n_2) \tag{46}$$

The signal received at the user terminal 530 in the second TS is shown in Equation (47):

$$r_5 = h_0 r_0 + h_3 r_3 + h_4 r_4 + n_3 \tag{47}$$

The reception SNR of the user terminal 530 is maximized by multiplying the signals received from the BS 510, RS1 and RS2 by Equation (48) below, respectively.

$$\frac{h_0^*}{\sqrt{h_1^2 h_3^2 + h_2^2 h_4^2 + h_0^2}}, \tag{48}$$

$$\frac{h_3^* h_1^*}{\sqrt{h_1^2 h_3^2 + h_2^2 h_4^2 + h_0^2}},$$

$$\frac{h_2^* h_4^*}{\sqrt{h_1^2 h_3^2 + h_2^2 h_4^2 + h_0^2}},$$

If RS1 and RS2 operate in the AF mode and use EGT, a signal transmitted by the BS 510 in the second TS is given by Equation (49):

$$r_0 = \sqrt{\frac{p}{3}}\, x \tag{49}$$

The signal forwarded by RS1 is given by Equation (50):

$$r_3 = \frac{\sqrt{\frac{p}{3}}}{|r_1|} (\sqrt{p}\, h_1 x + n_1) \tag{50}$$

and the signal forwarded by RS2 is given by Equation (51):

$$r_4 = \frac{\sqrt{\frac{p}{3}}}{|r_2|}(\sqrt{p}\,h_2 x + n_2) \qquad (51)$$

The total signal received at the user terminal 530 is given as Equation (52):

$$r_5 = h_0 r_0 + h_3 r_3 + h_4 r_4 + n_3 \qquad (52)$$

If RS1 and RS2 operate in the AF mode and use MRC, a signal transmitted by the BS 510 in the second TS is given by Equation (53):

$$r_0 = \sqrt{\frac{p}{3}}\,x \qquad (53)$$

The signal forwarded by RS1 is given by Equation (54):

$$r_3 = \frac{\sqrt{\frac{p}{3}}}{|r_1|}(\sqrt{p}\,h_1 x + n_1) \qquad (54)$$

and the signal forwarded by RS2 is given by Equation (55):

$$r_4 = \frac{\sqrt{\frac{p}{3}}}{|r_2|}(\sqrt{p}\,h_2 x + n_2) \qquad (55)$$

The total signal received in the second TS at the user terminal 530 is given as Equation (56):

$$r_5 = (h_0 r_0 + n_0) h^*_0 + (h_3 r_3 + n_3) h^*_3 + (h_4 r_4 + n_4) h^*_4 \qquad (56)$$

Let a modulation symbol be denoted by $\hat{x}$. Then, if RS1 and RS2 operate in the DF mode and use MRT, a signal transmitted by the BS 510 in the second TS is given by Equation (57):

$$r_0 = \frac{\sqrt{p}\,h^*_0 x}{\sqrt{h_3^2 + h_4^2 + h_0^2}} \qquad (57)$$

The signal forwarded by RS1 is given by Equation (58):

$$r_3 = \frac{\sqrt{p}\,h^*_3 \hat{x}}{\sqrt{h_3^2 + h_4^2 + h_0^2}} \qquad (58)$$

and the signal forwarded by RS2 is given by Equation (59):

$$r_4 = \frac{\sqrt{p}\,h^*_4 \hat{x}}{\sqrt{h_3^2 + h_4^2 + h_0^2}} \qquad (59)$$

Thus, the total signal received in the second TS at the user terminal 530 is given as Equation (60):

$$r_5 = h_0 r_0 + h_3 r_3 + h_4 r_4 + n_3 \qquad (60)$$

The reception SNR of the user terminal 530 is maximized by multiplying the signals received from the BS 510, RS1 and RS2 by $$\frac{h^*_0}{\sqrt{h_3^2 + h_4^2 + h_0^2}},\ \frac{h^*_3}{\sqrt{h_3^2 + h_4^2 + h_0^2}},\ \text{and}\ \frac{h^*_4}{\sqrt{h_3^2 + h_4^2 + h_0^2}},$$

respectively.

If RS1 and RS2 operate in the DF mode and use EGT, a signal transmitted by the BS 510 in the second TS is given by Equation (61):

$$r_0 = \sqrt{\frac{p}{3}}\,\hat{x} \qquad (61)$$

The signal forwarded by RS1 is given by Equation (62):

$$r_3 = \sqrt{\frac{p}{3}}\,\hat{x} \qquad (62)$$

and the signal forwarded by RS2 is given by Equation (63):

$$r_4 = \sqrt{\frac{p}{3}}\,\hat{x} \qquad (63)$$

The total signal received in the second TS at the user terminal 530 is $$r_5 = h_0 r_0 + h_3 r_3 + h_4 r_4 + n_3 \qquad (64)$$

If RS1 and RS2 operate in the DF mode and use MRC, a signal transmitted by the BS 510 in the second TS is given by Equation (65):

$$r_0 = \sqrt{\frac{p}{3}}\,\hat{x} \qquad (65)$$

The signal forwarded by RS1 is given by Equation (66):

$$r_3 = \sqrt{\frac{p}{3}}\,\hat{x} \qquad (66)$$

and the signal forwarded by RS2 is given by Equation (67):

$$r_4 = \sqrt{\frac{p}{3}}\,\hat{x} \qquad (67)$$

After MRC, the total received signal of the user terminal 530 is given as Equation (68):

$$r_5 = (h_0 r_0 + n_0) h^*_0 + (h_3 r_3 + n_3) h^*_3 + (h_4 r_4 + n_4) h^*_4 \qquad (68)$$

Signals received through different antennas or on different frequency channels are weighted with $h^*_3$, $h^*_4$ and $h^*_0$.

Figure 6:
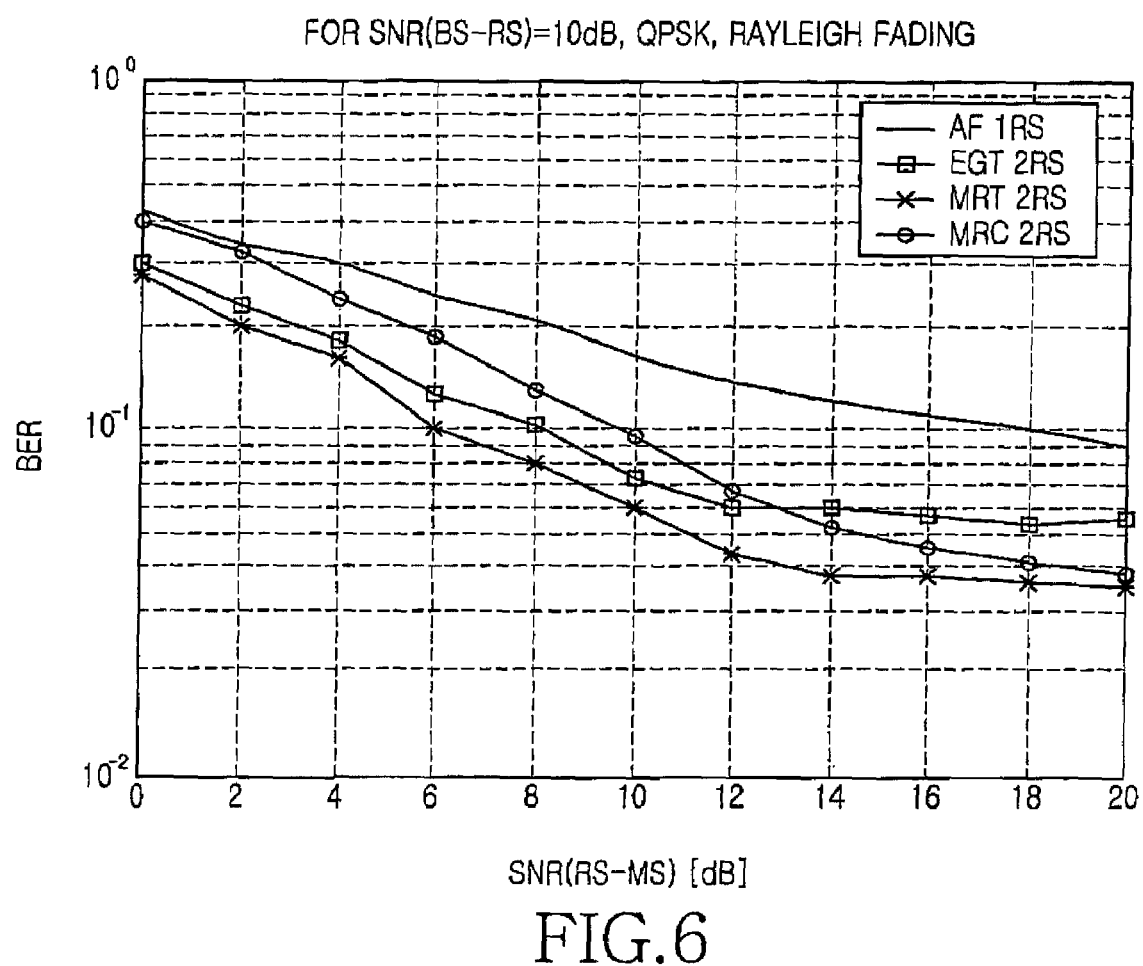
FIG. 6 is a graph illustrating performance in the case illustrated in FIG. 3 when an RS operates in Amplify and Forward (AF) mode.
Figure 7:
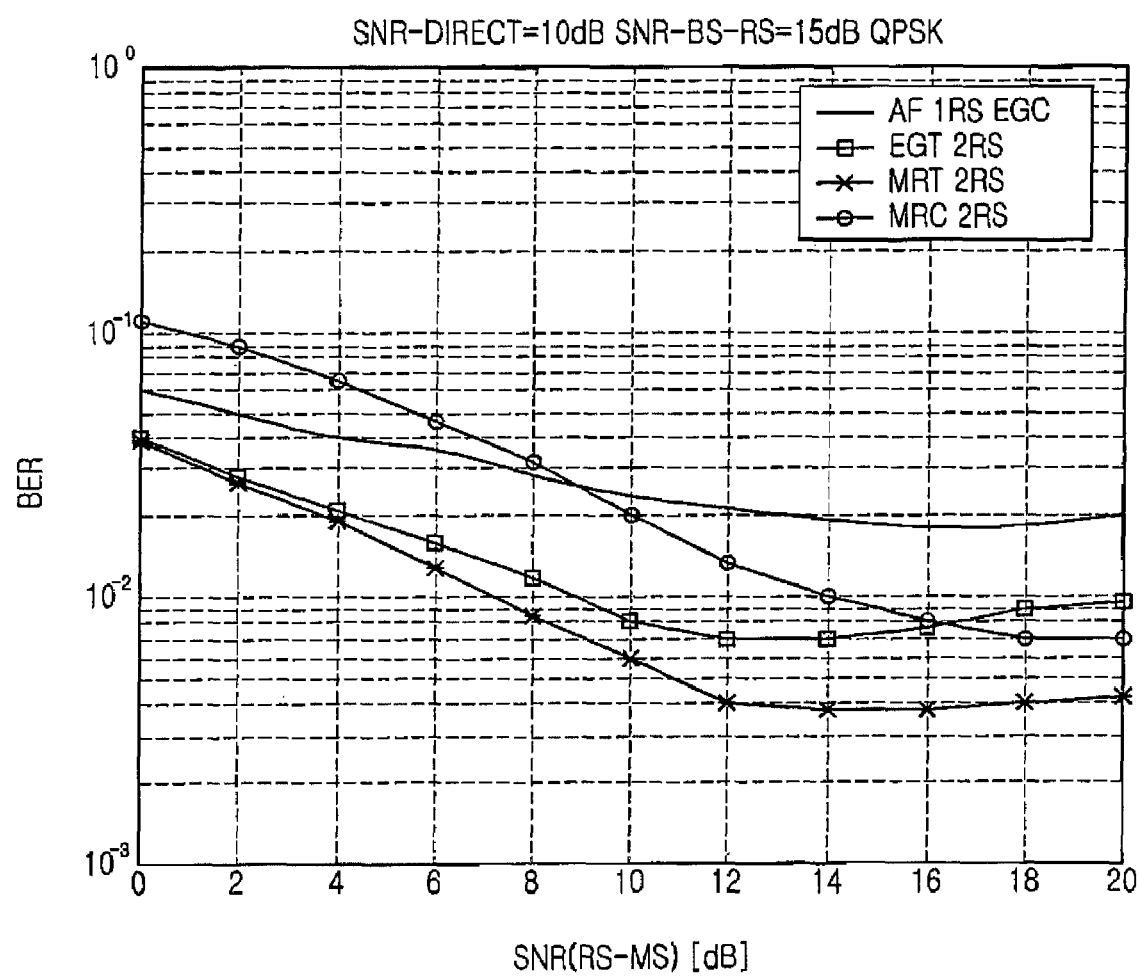
FIG. 7 is a graph illustrating performance in the case illustrated in FIG. 4 when the RS operates in the AF mode.
Figure 8:
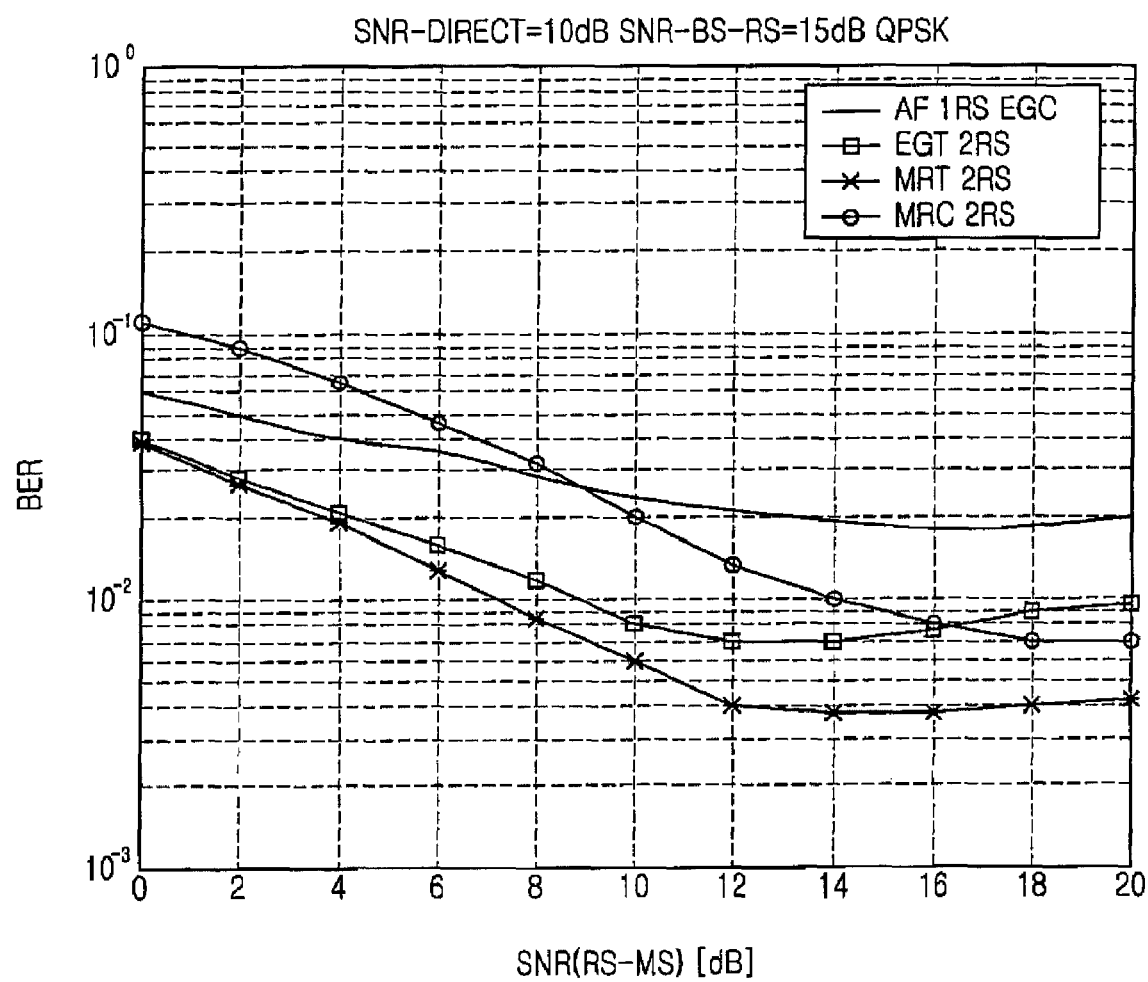
FIG. 8 is a graph illustrating performance in the case illustrated in FIG. 5 when the RS operates in the AF mode.

FIGS. 6, 7 and 8 illustrate the performance of the present invention when an RS operates in the AF mode under the environments illustrated in FIGS. 3, 4, and 5, respectively.

For detail explanation, FIG. 6 illustrates BER performance comparison for the case illustrated in FIG. 3 with AF mode in Rayleigh fading links, SNR(BS–RS)=10 dB with QPSK modulation.

FIG. 7 illustrates BER performance comparison for the case illustrated in FIG. 4 with AF mode in Rayleigh fading links, SNR(BS–MS)=10 dB and SNR(BS–RS)=15 dB with QPSK modulation.

FIG. 8 illustrates BER performance comparison for the case illustrated in FIG. 5 with AF mode in Rayleigh fading links, SNR(BS–MS)=10 dB and SNR(BS–RS)=15 dB with QPSK modulation.

From the results we can see that the proposed MRT scheme outperforms the EGT and the MRC schemes by few dBs in the AF mode.

Figure 9:
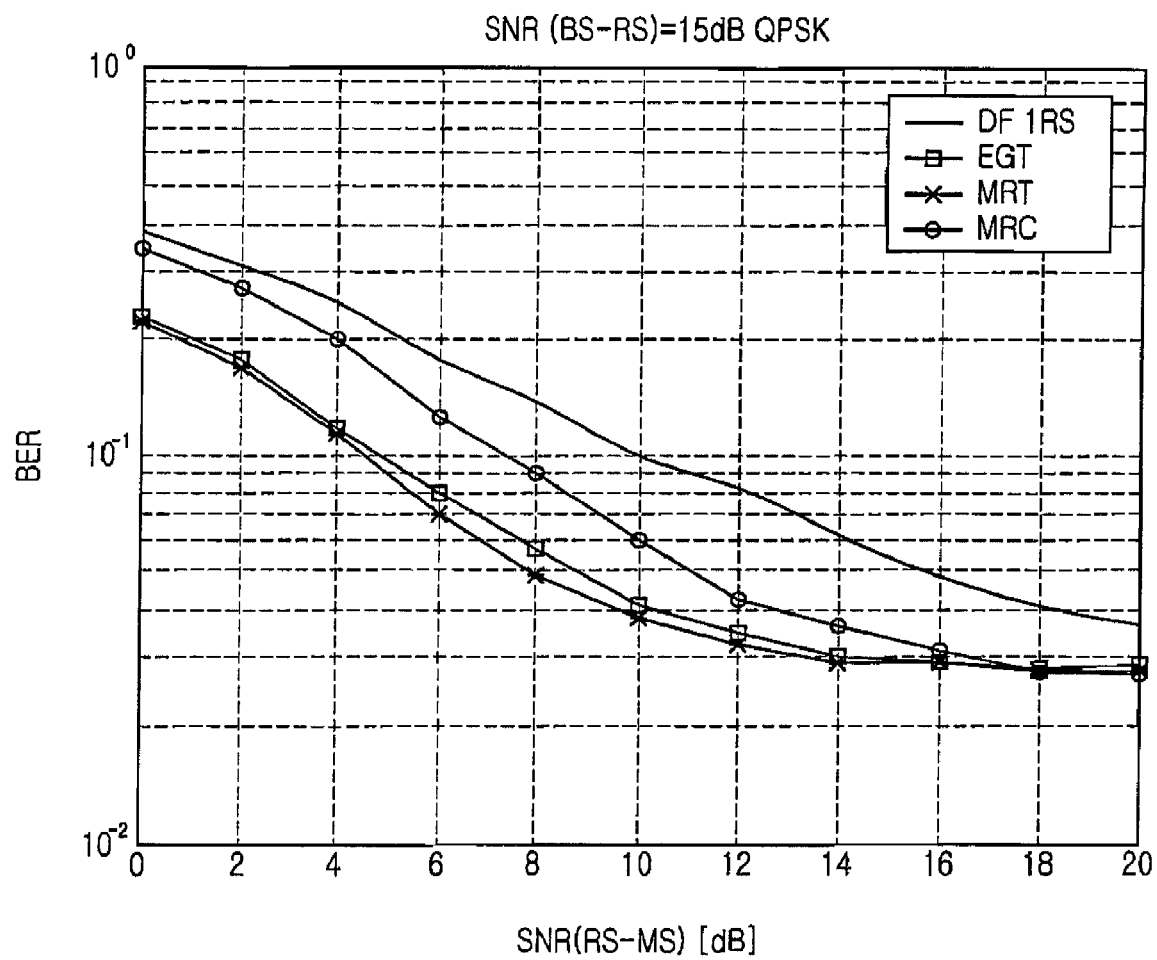
FIG. 9 is a graph illustrating performance in the case illustrated in FIG. 3 when the RS operates in Decode and Forward (DF) mode.
Figure 10:
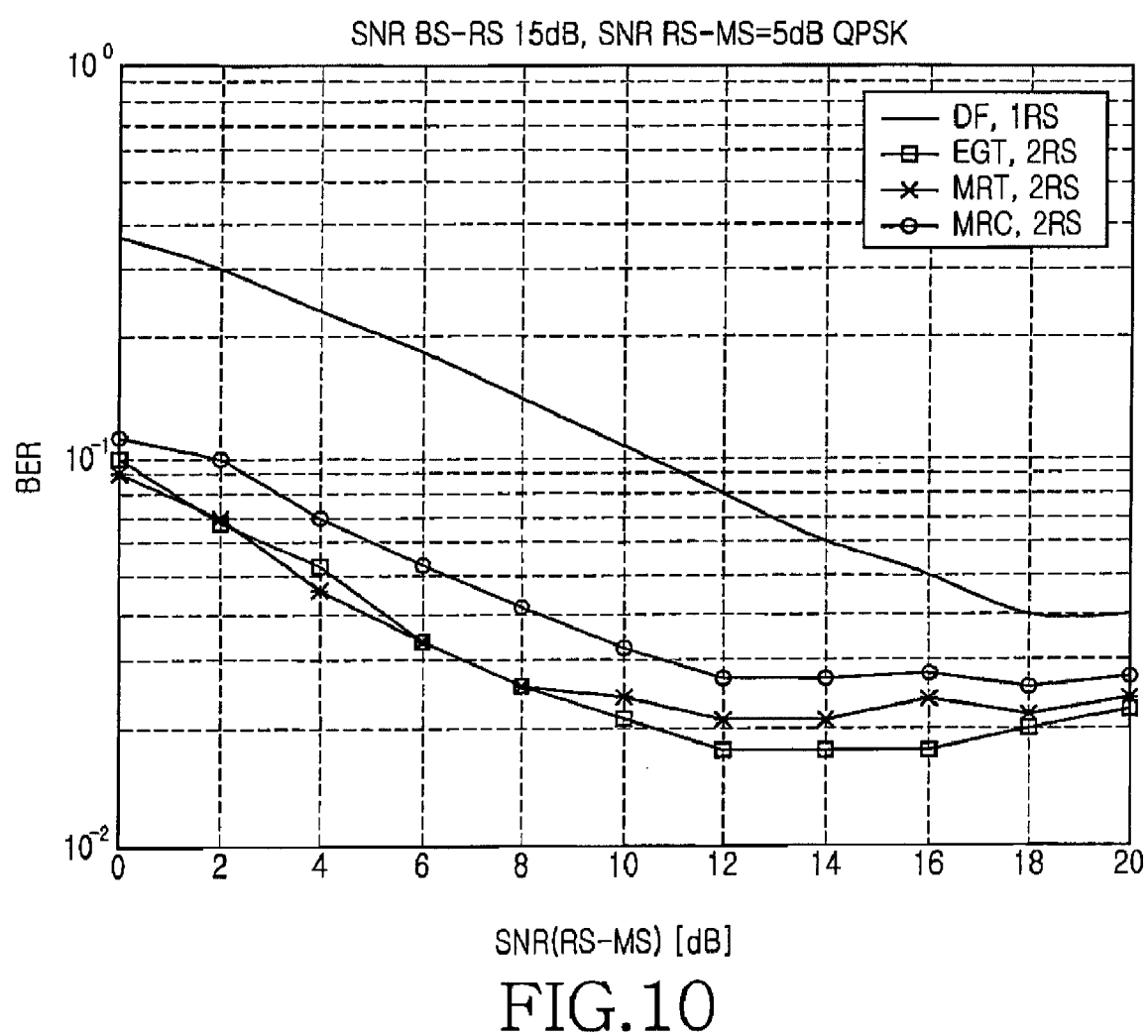
FIG. 10 is a graph illustrating performance in the case illustrated in FIG. 4 when the RS operates in the DF mode.
Figure 11:
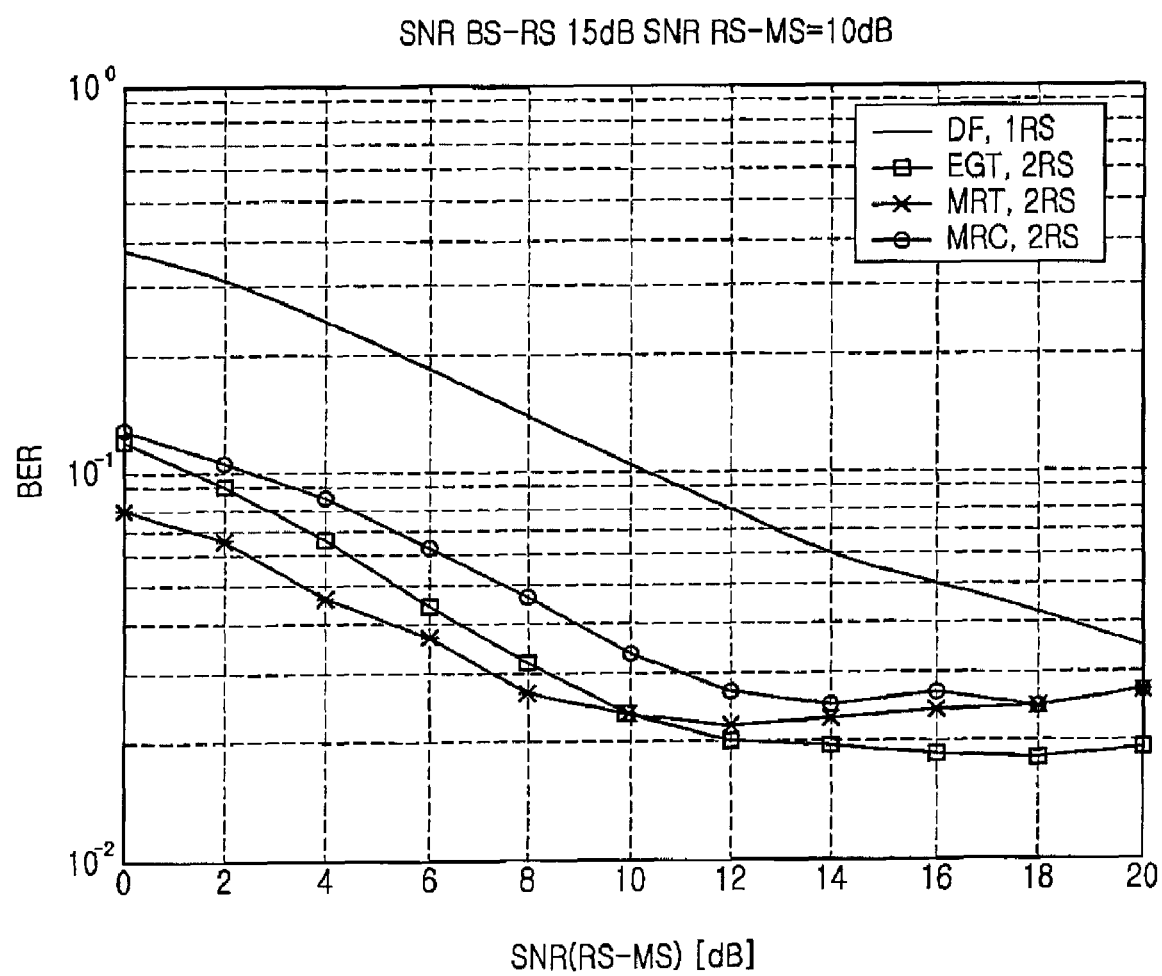
FIG. 11 is a graph illustrating performance in the case illustrated in FIG. 5 when the RS operates in the DF mode.

FIGS. 9, 10, and 11 illustrate the performance of the present invention when an RS operates in the DF mode under the environments illustrated in FIGS. 3, 4, and 5, respectively.

For detail explanation, FIG. 9 illustrates BER performance comparison for the case illustrated in FIG. 3 with DF mode in Rayleigh fading links, and SNR(BS–RS)=15 dB with QPSK modulation.

FIG. 10 illustrates BER performance comparison for the case illustrated in FIG. 4 with DF mode in Rayleigh fading links, SNR(BS–MS)=5 dB and SNR(BS–RS)=15 dB with QPSK modulation.

FIG. 11 illustrates BER performance comparison for the case illustrated in FIG. 5 with DF mode in Rayleigh fading links, SNR(BS–MS)=10 dB and SNR(BS–RS)=15 dB with QPSK modulation.

From the results we can see that the proposed MRT scheme outperforms the MRC scheme in the DF mode, however the performance of the EGT and MRT are quite similar because the SNR in the RS1 and RS2 in our simulation are assumed the same.

As is apparent from the above description, the present invention reduces inter-cell interference and thus saves power from transmission by enabling the use of MRT in a BWA communication system using RSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for transmitting data at a maximum ratio in a Broadband Wireless Access (BWA) communication system, comprising:
a Base Station (BS) for transmitting a signal directed to a user terminal to a Relay Station (RS) in a first time slot;
the RS for transmitting a signal received from the BS to the user terminal in a second time slot; and
the user terminal for receiving the signal received from the RS,
wherein if two RSs are used, and the RSs operate in an Amplify and Forward (AF) mode and use Maximum Ratio Transmission (MRT), a first RS of the two RSs transmits a signal expressed as the following equation to the user terminal, $$r_3 = \frac{\sqrt{p}\, h_3^* h_1^*}{|r_1|\sqrt{h_1^2 h_3^2 + h_2^2 h_4^2}} (\sqrt{p}\, h_1 x + n_1)$$

where p denotes a transmit power, $n_1$ denotes Additive White Gaussian Noise (AWGN), $h_1$ denotes a channel gain between the BS and the first RS, $h_2$ denotes a channel gain between the second RS and the BS, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, $h^*_1$ denotes a conjugate complex value of a channel gain between the BS and the first RS, x denotes a transmitted modulation symbol, $r_3$ denotes a signal transmitted by the first RS, and $r_1$ denotes a signal received from the BS at the first RS.

2. The system of claim 1, wherein a second RS, the other of the two RSs, transmits a signal expressed as the following equation to the user terminal, $$r_4 = \frac{\sqrt{p}\, h_2^* h_4^*}{|r_2|\sqrt{h_1^2 h_3^2 + h_2^2 h_4^2}} (\sqrt{p}\, h_2 x + n_2)$$

where $n_2$ denotes AWGN, $h^*_2$ denotes a conjugate complex value of a channel gain between the second RS and the BS, $h^*_4$ denotes a conjugate complex value of a channel gain between the second RS and the user terminal, $r_4$ denotes a signal transmitted by the second RS, and $r_2$ denotes a signal received from the BS at the second RS.

3. The system of claim 2, wherein a signal received at the user terminal is expressed as the following equation, $$r = h_3 r_3 + h_4 r_4 + n_3$$

where r denotes the received signal of the user terminal, $n_3$ denotes AWGN.

4. The system of claim 3, wherein Signal-to-Noise Ratio (SNR) of the received signal of the user terminal is maximized by multiplying $r_3$ by $$\frac{h_3^* h_1^*}{h_1^2 h_3^2 + h_2^2 h_4^2},$$

and multiplying $r_4$ by $$\frac{h_2^* h_4^*}{h_1^2 h_3^2 + h_2^2 h_4^2}.$$

5. A system for transmitting data at a maximum ratio in a Broadband Wireless Access (BWA) communication-system, comprising:
a Base Station (BS) for transmitting a signal directed to a user terminal to a Relay Station (RS) in a first time slot;
the RS for transmitting a signal received from the BS to the user terminal in a second time slot; and
the user terminal for receiving the signal received from the RS,
wherein if two RSs are used and the RSs operate in Decode and Forward (DF) mode and use MRT, a first RS as one of the two RSs, transmits a signal expressed as the following equation to the user terminal, $$r_3 = \frac{\sqrt{p}\, h_3^* \hat{x}}{\sqrt{h_3^2 + h_4^2}}$$

where p denotes a transmit power, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, $r_3$ denotes a signal transmitted by the first RS, and $\hat{x}$ denotes a transmitted modulation symbol.

6. The system of claim 5, wherein a second RS, the other of the two RSs, transmits a signal expressed as the following equation to the user terminal, $$r_4 = \frac{\sqrt{p}\, h_4^* \hat{x}}{\sqrt{h_3^2 + h_4^2}}$$

where $h^*_4$ denotes a conjugate complex value of a channel gain between the second RS and the user terminal.

7. The system of claim 6, wherein the signal received at the user terminal is expressed as the following equation, $$r = h_3 r_3 + h_4 r_4 + n_3$$

where r denotes the received signal of the user terminal, and $n_3$ denotes AWGN.

8. The system of claim 7, wherein SNR of the received signal of the user terminal is maximized by multiplying $r_3$ by $$\frac{h_3^*}{\sqrt{h_3^2 + h_4^2}},$$

and multiplying $r_4$ by $$\frac{h_4^*}{\sqrt{h_3^2 + h_4^2}}.$$

9. A system for transmitting data at a maximum ratio in a Broadband Wireless Access (BWA) communication system, comprising:
  a Base Station (BS) for transmitting a signal directed to a user terminal to a Relay Station (RS) and the user terminal in a first time slot;
  the RS for transmitting the signal received from the BS to the user terminal in a second time slot; and
  the user terminal for receiving the signal received from at least one of the RS and the BS,
  wherein if two RSs are used and the RSs operate in AF mode and use MRT, a first RS, one of the two RSs, transmits a signal expressed as the following equation to the user terminal, $$r_3 = \frac{\sqrt{p}\, h_3^* h_1^*}{|r_1|^2 \sqrt{h_1^2 h_3^2 + h_2^2 h_4^2}} (\sqrt{p}\, h_1 x + n_1)$$

where p denotes a transmit power, $n_1$ denotes AWGN, $h_1$ denotes a channel gain between the BS and the first RS, $h_2$ denotes a channel gain between the second RS and the BS, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, $h^*_1$ denotes a conjugate complex value of a channel gain between the BS and the first RS, x denotes a transmitted modulation symbol, $r_3$ denotes a signal transmitted by the first RS, and $r_1$ denotes a signal received from the BS at the first RS.

10. The system of claim 9, wherein a second RS being the other RS transmits a signal expressed as the following equation to the user terminal, $$r_4 = \frac{\sqrt{p}\, h_2^* h_4^*}{|r_2| \sqrt{h_1^2 h_3^2 + h_2^2 h_4^2}} (\sqrt{p}\, h_2 x + n_2)$$

where p denotes transmit power, $n_2$ denotes AWGN, $h^*_2$ denotes a conjugate complex value of a channel gain between the second RS and the BS, $h^*_4$ denotes a conjugate complex value of a channel gain between the second RS and the user terminal, $r_4$ denotes a signal transmitted by the second RS, and $r_2$ denotes a signal received from the BS at the second RS.

11. The system of claim 10, wherein if the user terminal receives the signal from the BS in the first time slot and the signals from the RSs in the second time slot, a total signal received at the user terminal is expressed as the following equation, $$r = r_0 h^*_0 + h_3 r_3 + h_4 r_4 + n_3$$

where r denotes a total received signal of the user terminal, $r_0$ denotes the signal received from the BS at the user terminal, $n_3$ denotes AWGN, and $h^*_0$ denotes a conjugate complex value of a channel gain between the BS and the user terminal.

12. The system of claim 11, wherein SNR of the received signal of the user terminal is maximized by multiplying $r_3$ by $$\frac{h_3^* h_1^*}{h_1^2 h_3^2 + h_2^2 h_4^2},$$

multiplying $r_4$ by $$\frac{h_2^* h_4^*}{h_1^2 h_3^2 + h_2^2 h_4^2},$$

and multiplying the signal received from the BS at the user terminal by $h^*_0$.

13. A system for transmitting data at a maximum ratio in a Broadband Wireless Access (BWA) communication system, comprising:
  a Base Station (BS) for transmitting a signal directed to a user terminal to a Relay Station (RS) and the user terminal in a first time slot
  the RS for transmitting the signal received from the BS to the user terminal in a second time slot; and
  the user terminal for receiving the signal received from at least one of the RS and the BS,
  wherein if two RSs are used and the RSs operate in DF mode and use MRT, a first RS being one of the RSs transmits a signal expressed as the following equation to the user terminal, $$r_3 = \frac{\sqrt{p}\, h_3^* \hat{x}}{\sqrt{h_3^2 + h_4^2}}$$

where $r_3$ denotes a signal transmitted by the first RS, p denotes a transmit power, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, and z denotes a transmitted modulation symbol.

14. The system of claim 13, wherein a second RS being the other RS transmits a signal expressed as the following equation to the user terminal, $$r_4 = \frac{\sqrt{p}\, h_4^* \hat{x}}{\sqrt{h_3^2 + h_4^2}}$$

where $h^*_4$ denotes the conjugate complex value of a channel gain between the second RS and the user terminal and $r_4$ denotes a signal transmitted by the second RS.

15. The system of claim 14, wherein if the user terminal receives the signal from the BS in the first time slot and the signals from the RSs in the second time slot, a total signal received at the user terminal is expressed as the following Equation, $$r = h^*_0 r_0 + r_5$$

where $h^*_0$ denotes a conjugate complex value of a channel gain between the BS and the user terminal, $r_0$ denotes a signal received from the BS at the user terminal, and $r_5$ denotes the signal received at the user terminal in the second time slot.

16. The system of claim 15, wherein SNR of the received signal of the user terminal is maximized by multiplying $r_3$ by $$\frac{h_3^*}{\sqrt{h_3^2 h_4^2}},$$

multiplying $r_4$ by $$\frac{h_4^*}{\sqrt{h_3^2 h_4^2}},$$

and multiplying the signal received from the BS at the user terminal by $h^*_0$.

17. The system of claim 10, wherein if the user terminal fails to receive the signal from the BS in the first time slot and receives the signal from the BS and the signals from the RSs in the second time slot, a total signal received at the user terminal in the second time slot is expressed as the following equation, $$r_5 = h_0 r_0 + h_3 r_3 + h_4 r_4 + n_3$$

where $r_5$ denotes a total signal received at the user terminal in the second time slot, $n_3$ denotes AWGN, $r_0$ denotes a signal received from the BS at the user terminal, and $h_0$ denotes a channel gain between the BS and the user terminal.

18. The system of claim 17, wherein $r_0$ is expressed as the following equation, $$r_0 = \frac{\sqrt{p}\, h_0^* x}{\sqrt{h_1^2 h_3^2 + h_2^2 h_4^2 + h_0^2}}$$

where $h_1$ denotes a channel gain between the BS and the first RS, $h_2$ denotes a channel gain between the second RS and the BS, and x denotes a transmitted modulation symbol, wherein SNR of the received signal of the user terminal is maximized by multiplying $$r_3\left(r_3 = \frac{\sqrt{p}\, h_3^* h_1^*}{|r_1|\sqrt{h_1^2 h_3^2 + h_2^2 h_4^2 + h_0^2}} (\sqrt{p}\, h_1 x + n_1)\right) \text{ by } \frac{h_3^* h_1^*}{\sqrt{h_1^2 h_3^3 + h_2^2 h_4^3 + h_0^2}}$$

where $n_1$ denotes AWGN and $h^*_3$ denotes a conjugate complex value of the channel gain between the first RS and the user terminal, multiplying $$r_4\left(r_4 = \frac{\sqrt{p}\, h_2^* h_4^*}{|r_2|\sqrt{h_1^2 h_3^2 + h_2^2 h_4^2 + h_0^2}} (\sqrt{p}\, h_2 x + n_2)\right) \text{ by } \frac{h_2^* h_4^*}{\sqrt{h_1^2 h_3^3 + h_2^2 h_4^3 + h_0^2}},$$

where $h^*_2$ denotes the conjugate complex value of the channel gain between the second RS and the BS and $n_2$ denotes AWGN, and multiplying $r_0$ by $$\frac{h_0^*}{\sqrt{h_1^2 h_3^2 + h_2^2 h_4^2 + h_0^2}}.$$

19. A system for transmitting data at a maximum ratio in a Broadband Wireless Access (BWA) communication system, comprising:

a Base Station (BS) for transmitting a signal directed to a user terminal to a Relay Station (RS) and the user terminal in a first time slot the RS for transmitting the signal received from the BS to the user terminal in a second time slot; and the user terminal for receiving the signal received from at least one of the RS and the BS, wherein if two RSs are used, the RSs operate in DF mode and use MRT, and the user terminal fails to receive the signal from the BS in the first time slot and receives the signal from the BS and the signals from the RSs in the second time slot, a first RS, one of the two RSs, transmits a signal expressed as the following equation to the user terminal, $$r_3 = \frac{\sqrt{p}\, h_3^* \hat{x}}{\sqrt{h_3^2 + h_4^2 + h_0^2}}$$

where p denotes transmit power, $r_3$ denotes a signal transmitted by the first RS, $h_0$ denotes a channel gain between the BS and the user terminal, $h_3$ denotes a channel gain between the first RS and the user terminal, $h_4$ denotes a channel gain between the second RS and the user terminal, $h^*_3$ denotes the conjugate complex value of a channel gain between the first RS and the user terminal, and $\hat{x}$ denotes a transmitted modulation symbol.

20. The system of claim 19, wherein a second RS, the other of the two RSs, transmits a signal expressed as the following equation to the user terminal, $$r_4 = \frac{\sqrt{p}\, h_4^* \hat{x}}{\sqrt{h_3^2 + h_4^2 + h_0^2}}$$

where $h^*_4$ denotes the conjugate complex value of a channel gain between the second RS and the user terminal.

21. The system of claim 20, wherein the signal received at the user terminal in the second time slot is given as the following equation, $$r_5 = h_0 r_0 + h_3 r_3 + h_4 r_4 + n_3$$

where $r_5$ denotes the signal received at the user terminal in the second time slot, $r_0$ denotes the signal received from the BS at the user terminal, $r_4$ denotes a signal transmitted by the second RS, and $n_3$ denotes AWGN.

22. The system of claim 21, wherein $r_0$ is expressed as the following equation, $$r_0 = \frac{\sqrt{p}\, h_0^* x}{\sqrt{h_3^2 + h_4^2 + h_0^2}}$$

where $h^*_0$ denotes the conjugate complex value of the channel gain between the BS and the user terminal, and
    wherein SNR of the received signal of the user terminal is maximized by multiplying $r_3$ by $$\frac{h_3^*}{\sqrt{h_3^2 + h_4^2 + h_0^2}},$$

multiplying $r_4$ by $$\frac{h_4^*}{\sqrt{h_3^2 + h_4^2 + h_0^2}}$$

and multiplying $r_o$ by $$\frac{h_0^*}{\sqrt{h_3^2 + h_4^2 + h_0^2}}.$$

23. A method for transmitting data at a maximum ratio in a Broadband Wireless Access (BWA) communication system, comprising:
    transmitting a signal to a Relay Station (RS) in a first time slot by a Base Station (BS); and
    transmitting a signal received from the BS to a user terminal in a second time slot by the RS,
    wherein if two RSs are used and the RSs operate in AF mode and use MRT, the transmission to the user terminal comprises transmitting a signal expressed as the following equation to the user terminal by a first RS, one of the two RSs, $$r_3 = \frac{\sqrt{p}\, h_3^* h_1^*}{|r_1|\sqrt{h_1^2 h_3^2 + h_2^2 h_4^2}} (\sqrt{p}\, h_1 x + n_1)$$

where p denotes a transmit power, $n_1$ denotes AWGN, $h_1$ denotes a channel gain between the BS and the first RS, $h_2$ denotes a channel gain between the second RS and the BS, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, $h^*_1$ denotes a conjugate complex value of a channel gain between the BS and the first RS, x denotes a transmitted modulation symbol, $r_3$ denotes a signal transmitted by the first RS, and $r_1$ denotes a signal received from the BS at the first RS.

24. The method of claim 23, wherein the transmission to the user terminal comprises transmitting a signal expressed as the following equation to the user terminal by a second RS, the other of the two RSs, $$r_4 = \frac{\sqrt{p}\, h_2^* h_4^*}{|r_2|\sqrt{h_1^2 h_3^2 + h_2^2 h_4^2}} (\sqrt{p}\, h_2 x + n_2)$$

where $n_2$ denotes AWGN, $h^*_2$ denotes a conjugate complex value of a channel gain between the second RS and the BS, $h^*_4$ denotes a conjugate complex value of a channel gain between the second RS and the user terminal, $r_4$ denotes a signal transmitted by the second RS, and $r_2$ denotes a signal received from the BS at the second RS.

25. The method of claim 24, wherein a signal received at the user terminal is expressed as the following equation, $$r = h_3 r_3 + h_4 r_4 + n_3$$

where r denotes the received signal of the user terminal, $n_3$ denotes AWGN, and $r_3$ denotes the signal transmitted by the first RS.

26. The method of claim 25, wherein SNR of the received signal of the user terminal is maximized by multiplying $r_3$ by $$\frac{h_3^* h_1^*}{h_1^2 h_3^2 + h_2^2 h_4^2},$$

and multiplying $r_4$ by $$\frac{h_2^* h_4^*}{h_1^2 h_3^2 + h_2^2 h_4^2}$$

where.

27. A method for transmitting data at a maximum ratio in a Broadband Wireless Access (BWA) communication system, comprising:
    transmitting a signal to a Relay Station (RS) in a first time slot by a Base Station (BS); and
    transmitting a signal received from the BS to a user terminal in a second time slot by the RS,
    wherein if two RSs are used and the RSs operate in DF mode and use MRT, the transmission to the user terminal comprises transmitting a signal expressed as the following equation to the user terminal by a first RS being one of the RSs, $$r_3 = \frac{\sqrt{p}\, h_3^* \hat{x}}{\sqrt{h_3^2 + h_4^2}}$$

where p denotes transmit power, $h_3$ denotes a channel gain between the first RS and the user terminal, $h_4$ denotes a channel gain between the second RS and the user terminal, $h^*_3$ denotes the conjugate complex value of a channel gain between the first RS and the user terminal, $r_3$ denotes a signal transmitted by the first RS, and $\hat{x}$ denotes a transmitted modulation symbol.

28. The method of claim 27, wherein the transmission to the user terminal comprises transmitting a signal expressed as the following equation to the user terminal by a second RS being the other RS, $$r_4 = \frac{\sqrt{p}\, h_4^* \hat{x}}{\sqrt{h_3^2 + h_4^2}}$$

where $h^*_4$ denotes the conjugate complex value of a channel gain between the second RS and the user terminal, and $r_4$ denotes a signal transmitted by the second RS.

29. The method of claim 28, wherein a signal received at the user terminal is expressed as the following equation, $$r = h_3 r_3 + h_4 r_4 + n_3$$

where r denotes the received signal of the user terminal and $n_3$ denotes AWGN.

30. The method of claim 29, wherein SNR of the received signal of the user terminal is maximized by multiplying $r_3$ by $$\frac{h_3^*}{\sqrt{h_3^2 h_4^2}},$$

and multiplying $r_4$ by $$\frac{h_4^*}{\sqrt{h_3^2 h_4^2}}.$$

31. A method for transmitting data at a maximum ratio in a Broadband Wireless Access (BWA) communication system, comprising:
transmitting a signal to a Relay Station (RS) and a user terminal in a first time slot by a Base Station (BS); and
transmitting the signal received from the BS to the user terminal in a second time slot by the RS,
wherein if two RSs are used and the RSs operate in AF mode and use MRT, the transmission to the user terminal in a second time slot comprises transmitting a signal expressed as the following equation to the user terminal by a first RS, one of the two RSs, $$r_3 = \frac{\sqrt{p}\, h_3^* h_1^*}{|r_1|\sqrt{h_1^2 h_3^2 + h_2^2 h_4^2}} (\sqrt{p}\, h_1 x + n_1)$$

where p denotes a transmit power, $n_1$ denotes AWGN, $h_1$ denotes a channel gain between the BS and the first RS, $h_2$ denotes a channel gain between the second RS and the BS, $h_3$ denotes a channel gain between the first RS and the user terminal, $h_4$ denotes a channel gain between the second RS and the user terminal, $h^*_3$ denotes a conjugate complex value of a channel gain between the first RS and the user terminal, $h^*_1$ denotes a conjugate complex value of a channel gain between the BS and the first RS, x denotes a transmitted modulation symbol, $r_3$ denotes a signal transmitted by the first RS, and $r_1$ denotes a signal received from the BS at the first RS.

32. The method of claim 31, wherein the transmission to the user terminal in a second time slot comprises transmitting a signal expressed as the following equation to the user terminal by a second RS being the other RS, $$r_4 = \frac{\sqrt{p}\, h_2^* h_4^*}{|r_2|\sqrt{h_1^2 h_3^2 + h_2^2 h_4^2}} (\sqrt{p}\, h_2 x + n_2)$$

where p denotes transmit power, $n_2$ denotes AWGN, $h^*_2$ denotes a conjugate complex value of a channel gain between the second RS and the BS, $h^*_4$ denotes a conjugate complex value of a channel gain between the second RS and the user terminal, $r_4$ denotes a signal transmitted by the second RS, and $r_2$ denotes a signal received from the BS at the second RS.

33. The method of claim 32, wherein if the user terminal receives the signal from the BS in the first time slot and the signals from the RSs in the second time slot, a total signal received at the user terminal is expressed as the following equation, $$r = r_0 h^*_0 + h_3 r_3 + h_4 r_4 + n_3$$

where r denotes the total received signal of the user terminal, $r_0$ denotes the signal received from the BS at the user terminal, $n_3$ denotes AWGN, and $h^*_0$ denotes the conjugate complex value of a channel gain between the BS and the user terminal.

34. The method of claim 33, wherein SNR of the received signal of the user terminal is maximized by multiplying $r_3$ by $$\frac{h_3^* h_1^*}{h_1^2 h_3^2 + h_2^2 h_4^2},$$

multiplying $r_4$ by $$\frac{h_2^* h_4^*}{h_1^2 h_3^2 + h_2^2 h_4^2}, \quad \text{and}$$

multiplying the signal received from the BS at the user terminal by $h^*_0$.

35. A method for transmitting data at a maximum ratio in a Broadband Wireless Access (BWA) communication system, comprising:
transmitting a signal to a Relay Station (RS) and a user terminal in a first time slot by a Base Station (BS); and
transmitting the signal received from the BS to the user terminal in a second time slot by the RS,
wherein if two RSs are used and the RSs operate in DF mode and use MRT, the transmission to the user terminal in a second time slot comprises transmitting a signal expressed as the following equation to the user terminal by a first RS being one of the RSs, $$r_3 = \frac{\sqrt{p}\, h_3^* \hat{x}}{\sqrt{h_3^2 + h_4^2}}$$

where p denotes transmit power, $h_3$ denotes a channel gain between the first RS and the user terminal, $h_4$ denotes a channel gain between the second RS and the user terminal, $h^*_3$ denotes the conjugate complex value of a channel gain between the first RS and the user terminal, $r_3$ denotes a signal transmitted by the first RS, and $\hat{x}$ denotes a transmitted modulation symbol.

36. The method of claim 35, wherein the transmission to the user terminal in a second time slot comprises transmitting a signal expressed as the following equation to the user terminal by a second RS being the other RS, $$r_4 = \frac{\sqrt{p}\, h_4^* \hat{x}}{\sqrt{h_3^2 + h_4^2}}$$

where and $h^*_4$ denotes the conjugate complex value of a channel gain between the second RS and the user terminal, and $r_4$ denotes a signal transmitted by the second RS.

37. The method of claim 36, wherein if the user terminal receives the signal from the BS in the first time slot and the signals from the RSs in the second time slot, a total signal received at the user terminal is expressed as the following equation, $$r = h^*_0 r_0 + r_5$$

where $h^*_0$ denotes the conjugate complex value of a channel gain between the BS and the user terminal, r denotes the received signal of the user terminal, $r_5$ denotes the signal received at the user terminal in the second time slot, and $r_0$ denotes the signal received from the BS at the user terminal.

38. The method of claim 37, wherein SNR of the received signal of the user terminal is maximized by multiplying $r_3$ by $$\frac{h_3^*}{\sqrt{h_3^2 + h_4^2}},$$

multiplying $r_4$ by $$\frac{h_4^*}{\sqrt{h_3^2 + h_4^2}}, \text{ and}$$

multiplying the signal received from the BS at the user terminal in the first time slot by $h^*_0$.

39. The method of claim 32, wherein if the user terminal fails to receive the signal from the BS in the first time slot and receives the signal from the BS and the signals from the RSs in the second time slot, a total signal received at the user terminal in the second time slot is expressed as the following equation, $$r_5 = h_0 r_0 + h_3 r_3 + h_4 r_4 + n_3$$

where $r_5$ denotes the total signal received at the user terminal in the second time slot, $n_3$ denotes AWGN, $r_0$ denotes the signal received from the BS at the user terminal, and $h_0$ denotes a channel gain between the BS and the user terminal.

40. The method of claim 39, wherein $r_0$ is expressed as the following equation, $$r_0 = \frac{\sqrt{p}\, h_0^* x}{\sqrt{h_1^2 h_3^2 + h_2^2 h_4^2 + h_0^2}}$$

where $h^*_0$ denotes the conjugate complex value of the channel gain between the BS and the user terminal, and
wherein SNR of the received signal of the user terminal is maximized by multiplying $$r_3 \left( r_3 = \frac{\sqrt{p}\, h_3^* h_1^*}{|r_1|\sqrt{h_1^2 h_3^2 + h_2^2 h_4^2 + h_0^2}} (\sqrt{p}\, h_1 x + n_1) \right) \text{ by } \frac{h_3^* h_1^*}{\sqrt{h_1^2 h_3^2 + h_2^2 h_4^2 + h_0^2}}$$

where $h^*_1$ denotes the conjugate complex value of the channel gain between the BS and the first RS and $h^*_3$ denotes the conjugate complex value of the channel gain between the first RS and the user terminal, multiplying $$r_4 \left( r_4 = \frac{\sqrt{p}\, h_2^* h_4^*}{|r_2|\sqrt{h_1^2 h_3^2 + h_2^2 h_4^2 + h_0^2}} (\sqrt{p}\, h_2 x + n_2) \right) \text{ by } \frac{h_2^* h_4^*}{\sqrt{h_1^2 h_3^2 + h_2^2 h_4^2 + h_0^2}},$$

and multiplying $r_0$ by $$\frac{h_0^*}{\sqrt{h_1^2 h_3^2 + h_2^2 h_4^2 + h_0^2}}.$$

41. A method for transmitting data at a maximum ratio in a Broadband Wireless Access (BWA) communication system, comprising:
transmitting a signal to a Relay Station (RS) and a user terminal in a first time slot by a Base Station (BS); and
transmitting the signal received from the BS to the user terminal in a second time slot by the RS,
wherein if two RSs are used, the RSs operate in DF mode and use MRT, and the user terminal fails to receive the signal from the BS in the first time slot and receives the signal from the BS and the signals from the RSs in the second time slot, the transmission to the user terminal in a second time slot comprises transmitting a signal expressed as the following equation to the user terminal by a first RS, one of the two RSs, $$r_3 = \frac{\sqrt{p}\, h_3^* \hat{x}}{\sqrt{h_3^2 + h_4^2 + h_0^2}}$$

where p denotes transmit power, $h_0$ denotes a channel gain between the BS and the user terminal, $h_3$ denotes a channel gain between the first RS and the user terminal, $h_4$ denotes a channel gain between the second RS and the user terminal, $h^*_3$ denotes the conjugate complex value of a channel gain between the first RS and the user terminal, and $\hat{x}$ denotes a transmitted modulation symbol.

42. The method of claim 41, wherein the transmission to the user terminal in a second time slot comprises transmitting a signal expressed as the following equation to the user terminal by a second RS, the other of the two RSs, $$r_4 = \frac{\sqrt{p}\, h_4^* \hat{x}}{\sqrt{h_3^2 + h_4^2 + h_0^2}}$$

where $h_4^*$ denotes the conjugate complex value of a channel gain between the second RS and the user terminal, and $r_4$ denotes a signal transmitted by the second RS.

43. The method of claim 42, wherein a signal received at the user terminal in the second time slot is given as the following equation, $$r_5 = h_0 r_0 + h_3 r_3 + h_4 r_4 + n_3$$

where $r_5$ denotes a signal received at the user terminal in the second time slot, $r_0$ denotes the signal received from the BS at the user terminal, and $n_3$ denotes AWGN.

44. The method of claim 43, wherein $r_0$ is expressed as the following equation, $$r_0 = \frac{\sqrt{p}\, h_0^* x}{\sqrt{h_3^2 + h_4^2 + h_0^2}}$$

where x denotes a transmitted modulation symbol and $h_0^*$ denotes the conjugate complex value of the channel gain between the BS and the user terminal, and wherein SNR of the received signal of the user terminal is maximized by multiplying $r_3$, in the following equation, by $$\frac{h_3^*}{\sqrt{h_3^2 + h_4^2 + h_0^2}},$$

multiplying $r_4$ by $$\frac{h_4^*}{\sqrt{h_3^2 + h_4^2 + h_0^2}}$$

where $h_4^*$ denotes the conjugate complex value of the channel gain between the second RS and the user terminal, and multiplying $r_0$ by $$\frac{h_0^*}{\sqrt{h_3^2 + h_4^2 + h_0^2}}.$$

* * * * *